United States Patent [19]

Stewart et al.

[11] 3,854,929
[45] Dec. 17, 1974

[54] PROCESS OF BENEFICIATING TITANIFEROUS ORES IN THE PRESENCE OF HYDROGEN CHLORIDE

[75] Inventors: Donald Fergusson Stewart, Doncaster; Leslie John Pollard, Lower Templestowe, both of Australia

[73] Assignee: ICI Australia Limited, Melbourne, Victoria, Australia

[22] Filed: Mar. 22, 1973

[21] Appl. No.: 343,664

Related U.S. Application Data

[63] Continuation-in-part of Ser. No. 242,804, April 11, 1972, abandoned, which is a continuation-in-part of Ser. No. 228,315, Feb. 22, 1972.

[30] Foreign Application Priority Data

| Mar. 1, 1971 | Australia | 4156/71 |
| Mar. 1, 1971 | Australia | 4157/71 |
| Mar. 1, 1971 | Australia | 4158/71 |
| Mar. 1, 1971 | Australia | 4159/71 |

[52] U.S. Cl............................. 75/1, 423/83, 75/30, 75/33, 106/51
[51] Int. Cl......................... C21b 1/00, C01g 23/04
[58] Field of Search ............... 75/1 TI, 2, 3, 21, 33, 75/34, 30, 29; 423/80, 82, 83; 106/51

[56] References Cited
UNITED STATES PATENTS

| 1,858,274 | 5/1932 | Kern et al. | 75/3 |
| 2,184,884 | 12/1939 | Muskat et al. | 423/75 |
| 2,860,046 | 11/1958 | Edstrom et al. | 75/34 |
| 3,120,999 | 2/1964 | Rummery et al. | 423/246 |

FOREIGN PATENTS OR APPLICATIONS

| 791,366 | 2/1958 | Great Britain | 75/1 TI |

*Primary Examiner*—Winston A. Douglas
*Assistant Examiner*—Mark Bell
*Attorney, Agent, or Firm*—Cushman, Darby & Cushman

[57] ABSTRACT

A process of producing metallic iron from iron oxides in an oxide containing material comprising iron oxide and a non-ferrous metal oxide wherein the oxide containing material is heated in the presence of hydrogen chloride, flux and a solid carbonaceous material to a temperature below that at which a slag is formed.

22 Claims, No Drawings

PROCESS OF BENEFICIATING TITANIFEROUS ORES IN THE PRESENCE OF HYDROGEN CHLORIDE

This application is a continuation-in-part of Ser. No. 242,804 filed Apr. 10, 1972, and now abandoned; said Ser. No. 242,804 being a continuation-in-part of Ser. No. 228,315 filed Feb. 22, 1972.

This invention relates to the beneficiation of the non-ferrous metal values of oxide containing materials comprising substantial amounts of iron.

The term "oxide containing materials" include mineral ores and slags or residues formed in metallurgical processed which comprise non-ferrous metal oxides. It is known that the iron content in certain oxide ores containing non-ferrous metals such as for example, manganese, chromium, titanium, vanadium and aluminium and the alkali and alkaline earth metals may be selectively reduced to metallic iron leaving the non-ferrous oxides substantially unreduced. It is also known that the addition of small amounts of sodium chloride to the reduction mixture increases the size of the particles of metallic iron formed by this selective reduction.

We have now found that the size of these iron particles and moreover their segregation from the non-ferrous oxides may be enhanced if hydrogen chloride is present in the furnace atmosphere. The iron particles so formed are easier to remove from the non-ferrous metal oxides by physical means.

Accordingly we provide a process of producing metallic iron from iron oxides in an oxide containing material comprising iron oxide and a non-ferrous metal oxide wherein the oxide containing material is heated, in the presence of hydrogen chloride, and a flux, and a solid carbonaceous material, to a temperature below that at which a slag is formed.

The oxide containing material should be heated to a sufficiently high temperature for the iron oxide component of the oxide containing material to be reduced and the iron to segregate. For normal oxide containing material suitable temperatures lie in the range form 900° to 1200°C.

The concentration of hydrogen chloride maintained in the atmosphere is not narrowly critical. We have found the even low concentrations of hydrogen chloride give an unexpectedly large improvement in the physical form of the reduced iron.

Preferably sufficient hydrogen chloride is maintained in the atmosphere so that substantially all the iron values in the ore are formed as metallic iron remote from the relict grains rather than being deposited in situ. Thus we prefer that the partial pressure of hydrogen chloride is maintained above $10^{-4}$ atmospheres most preferably between 0.005 and 0.04 atmospheres. Although higher partial pressures of hydrogen chloride in no way suppress the mechanism by which metallic iron is deposited remote from the relict grains they can cause loss of iron from the reaction system as volatile iron chlorides. Such iron loss can cause problems in the practical application of the process. The optimum partial pressure of hydrogen chloride has been found to vary with both ore and temperature and may be found by simple experiment.

The hydrogen chloride may be added to the atmosphere either by the addition of hydrogen chloride gas or by the addition of a compound which under the conditions of the process will either readily break down or will react with a component of the mixture to form hydrogen chloride. Thus for example the hydrogen chloride may be added in the form of additional iron chloride, chlorine or organic chlorine containing materials. The hydrogen chloride may be formed in situ by hydrolysis of the preferred form of flux as hereafter defined possibly aided by silica, alumina, iron oxides or other constituents of the ore.

Although we in no way wish to be bound by this theory we believe that the hydrogen chloride converts the iron oxide present in the ore to iron chloride which dissolves in the molten flux and is thus trapped probably as a flux/iron chloride complex salt. We believe that on reduction of the iron chloride, hydrogen chloride is regenerated and may recombine with further iron oxide.

By flux we mean a composition comprising at least one alkali metal chloride or alkaline earth metal chloride. Whilst such a flux may comprise a single alkali metal chloride or alkaline earth metal chloride it lies within our invention that a flux may comprise a mixture of two or more alkali metal chlorides or a mixture of two or more alkaline earth metal chlorides or a mixture of at least one alkali metal chloride with at least one alkaline earth metal salt. A suitable flux may comprise for example sodium chloride alone or alternatively in admixture with one or more other salts such as borax, sodium carbonate, calcium chloride, magnesium shloride, calcium fluoride, calcium sulphate, sodium sulphate, apatite or dolomite. Preferably the flux used in our process is potassium chloride or sodium chloride either separately or in admixture.

Although the amount of flux present in the reaction is not narrowly critical we prefer that sufficient flux should be present to form a continuous liquid phase bridging the oxide containing ore and the solid carbonaceous material. The preferred amount of flux required is dependent on the void space in the mixture of ore and solid carbonaceous material.

We have found that suitable weight ratios of ore to flux lie in the range from 50:1 to 1:5 preferably 5:1 to 1.2:1. Suitable solid carbonaceous materials are for example carbon, coke or coal. an added advantage of such solid carbonaceous materials is that such materials as well as acting as a reducing agent also absorb the flux and thus minimise sticking in the reaction bed.

Our process is of use in the removal of iron oxide from for example low grade manganese ore, vanadium, niobium and tantalum containing slags and concentrates, and concentrates of chromite ores.

Preferably the process of our invention is used in the beneficiation of ilmenite and other titaniferous ores to a high grade titanium oxide concentrate which can be used as a substitute for rutile. Titanium metal and titanium oxide pigments are mostly made from either ilmenite or rutile. Ilmenite contains substantial proportions of iron; is soluble in sulphuric acid and is usually converted into titanium oxide by the so-called sulphate process. This sulphate process has however, several disadvantages; amongst these the production of an undesired effluent of sulphuric acid contaminated with iron is particularly objectionable both from the point of view of raw material economy and pollution of the environment.

Naturally occurring rutile has a much lower iron content but is not soluble in sulphuric acid and is thus not suitable as a raw material for the sulphate process. Rutile is normally converted into titanium pigments or metal by the well known so-called chloride process.

As rutile contains only traces of iron the chloride process has the advantage over the sulphate process of not having an iron containing effluent problem.

Known world resources of natural rutile are limited and are growing at a much lower rate than the demand for such rutile for use in the chloride process. Supply of ilmenite by contrast is relatively abundant. The present situation is therefore that the raw material available in abundance (ilmenite) is linked to a process with relatively low growth potential (the sulphate process) and the raw material which is in scarce supply (rutile) is linked to a process with high growth potential, the chloride process. There is therefore a need for a process of up-grading titaniferous ores, particularly ilmenite, to titanium oxide concentrates containing small amounts of iron and suitable as a substitute for natural rutile in, for example, the chloride process. Several such processes have been suggested; most of these involve reduction of the ore followed by removal of the iron by a preferential leaching such as treatment with hydrochloric acid or ferric chloride or selective oxidation of the iron in an acidic medium. The treatment with chlorine compounds or oxidation in an acidic medium is expensive as to raw material consumption and imposes severe corrosion problems; in addition some of these treatments also pose problems with the disposal of effluents.

We have now found a process whereby, during the reduction step, iron is formed in sufficient purity and in the required particle size such as to permit physical separation from the titanium oxides and to yield a high grade titanium dioxide. Furthermore we have found that our high grade titanium dioxide is suitable as a raw material not only for the chloride process but also for the sulphate process. In addition we have descovered that it is possible to conduct our process in such a manner that two titanium oxide fractions may be obtained one of which approximates that titanium dioxide content of naturally occurring rutile and the other one of which, while slightly higher in iron content, is an excellent raw material for the sulphate process.

Accordingly in one aspect of our invention we provide a process for producing metallic iron concentrates and titanium oxide concentrates from titaniferous ores which process comprises heating a mixture comprising flux, ore and solid reducing agent in the presence of hydrogen chloride to a temperature below that at which a slag is formed so as to cause formation of metallic iron and separating the metallic iron formed thereby from the titanium oxide by physical means.

The weight ratio of ore to flux is not narrowly critical. Too little flux causes inefficient segregation of the iron due to noncontinuity of a liquid phase between the ilmenite and the solid carbonaceous material. Too much flux causes the mixture to become sticky and agglomerate. We have found that suitable weight ratios of ore to flux lie in the range from 50:1 to 1:5 preferably 5:1 to 1.2:1 and most preferably 2.5:1 to 1.4:1.

The amount of hydrogen chloride added to the reaction is not narrowly critical as the hydrogen chloride to some extent appears to be regenerated during the course of reduction thus for example we have found that using a partial pressure of $10^{-5}$ atmospheres the iron particles are larger and more segregated from the relict grains than the particles obtained in the absence of added hydrogen chloride, but too high a partial pressure of hydrogen chloride will cause loss of iron from the system as volatile iron chlorides. Sufficient hydrogen chloride must be added such that the HCl is not entirely consumed by chloride consuming impurities in the ore. By chloride consuming impurities we mean oxides such as for example manganese oxides which will react with hydrogen chloride but are not subsequently reduced to reform hydrogen chloride.

The partial pressure of hydrogen chloride within the reaction mixture is difficult to measure. However we have found that satisfactory results may be obtained when the partial pressure of hydrogen chloride in the inlet gas to the reactor is in the range from $10^{-4}$ atmospheres to 0.6 atmospheres preferably from 0.005 to 0.04 atmospheres.

The optimum partial pressure of hydrogen chloride depends on the ore and the temperature used in our process.

We have also found that satisfactory results may be obtained when an hydrogen chloride generator is added to the feed in such amounts as will theoretically produce the required partial pressure of hydrogen chloride within the reaction mixture.

Preferably the hydrogen chloride generator should not release hydrogen chloride during heating to reaction temperature and should not introduce impurities into the system.

We have found a suitable hydrogen chloride generator to be ferrous chloride

Using a Western Australian ilmenite and adding $FeCl_2.4H_2O$ as the hydrogen chloride generator we have obtained satisfactory results with a ratio of hydrogen chloride generator to ore as low as 0.02:1.

The optimum amount required for any particular ore and hydrogen chloride generator can be determined by simple experiment.

Sufficient solid carbonaceous reductant must be added to achieve metallisation of the iron present in the ore. We have found that this requires a small excess over the theoretical requirement however we have also found that an increase in reductant above that required for metallisation can lead under certain circumstances to inefficient segregation.

Thus for a typical ilmenite ore containing 31 weight per cent iron we prefer to maintain the weight ratio of solid carbonaceous material expressed as carbon to ore between 0.1:1 and 0.3:1 most preferably between 0.12:1 and 0.25:1.

To achieve the desired segregation of iron we prefer to maintain the reaction temperature in the range from 1,050° to 1,250°C. Preferably the mixture of reactants is held for as short a time as possible in the temperature range at which reduction of iron in ilmenite occurs at an appreciable rate but below that at which the reduction of the flux/iron chloride complex salt and regeneration of hydrogen chloride occurs. Most preferably the reaction temperature is in the range 1,100 to 1,200°C and the mixture of reactants does not spend more than 15 minutes in the temperature range 950° to 1,050°C.

Alternatively the atmosphere in the kiln may be kept non-reducing while in the temperature range 950° to 1,050°C. This can be achieved for example by the addition to the furnace gases oxygen or carbon dioxide.

The reduced ore may be separated into metallic iron and titanium oxide concentrate by any suitable means such as for example air or water elutriation. However we prefer to use a magnetic separation technique.

A further process according to the present invention is characterised in that the reduced material is separated by means of the magnetic separation stage into three fractions, namely, a first highly magnetic fraction, a second intermediate fraction which is slightly magnetic in admixture with titanium oxide and a third substantially non-magnetic fraction comprising the bulk of the titanium oxides.

We have found that the metallic iron in the first fraction is of a high degree of purity and is of a quality suitable for steel making operations. The second fraction containing a small proportion of iron can be used as a raw material for the sulphate process with the added advantage that as the proportion of iron is lower than natural ilmenite the pollution problem is reduced. Alternatively the second fraction may be recycled and used as raw material for our process.

The third fraction is a high quality substitute for rutile and may be used as raw material for the chloride process for the manufacture of titanium metal and titanium pigments or as a high grade acid soluble titanium oxide concentrate for use as a raw material for the sulphate process of manufacture of titanium oxide pigments.

The process of our invention may be carried out either batchwise or in a continuous manner.

Preferably the reaction is carried out in a counter current feed kiln wherein the mixture of flux and ilmenite and solid reducing agent is fed through the kiln continuously in one direction while gases are fed through the kiln in the opposite direction. Most preferably the process is carried out in a gravity fed vertical kiln.

The use of a counter current furnace such as a vertical kiln in the process of our invention has certain important advantages. Firstly, some of the flux is recycled to a certain extent by refluxing from the hot section of the kiln to the cold section of the kiln thus reducing the amount of flux which must be added in the feed to achieve optimum process conditions and secondly the amount of hydrogen chloride to be added to the kiln gases may be reduced as we believe that the hydrogen chloride generated is to some extent recycled. The continuous process may be carried out with continuous addition of enough hydrogen chloride to the gases in the kiln to ensure that an optimum amount of HCl is always present in the first section of the furnace. Alternatively no hydrogen chloride need be added continuously but either the furnace run until enough hydrogen chloride has been formed from breakdown of the flux for the reaction to proceed or a single addition of hydrogen chloride made at start up of the process. Obviously the process of our invention may also be run with the addition of amounts of hydrogen chloride intermediate to these two extremes such as intermittent periodic addition. The kiln may be heated by passing through the furnace hot gases produced by burning fuel oil or other carbonaceous material. Alternatively air may be passed through the furnace which will allow part of the carbonaceous reducing agent to burn. The feed to the furnace may be in any convenient physical form known in the art.

Preferably the ilmenite is pelleted in admixture with the flux and the solid carbonaceous reducing agent.

The reduced charge may be removed from the kiln by any convenient means known in the art. The reduced charge after removal from the kiln is washed with water to remove flux and soluble impruities and the solid residue separated into metallic iron concentrate and titanium oxide concentrates by magnetic means.

Although we prefer to add hydrogen chloride or a special hydrogen chloride generator to the reaction mixture such addition is not strictly necessary. The necessary hydrogen chloride atmosphere may be maintained in our process from breakdown of a chloride containing flux if a large enough amount of such flux is present. We have found that it is possible to generate an atmosphere comprising sufficient hydrogen chloride, for example, a partial pressure of above $10^{-5}$ atmospheres, by use of a flux chosen from the group consisting of alkali metal chlorides, alkaline earth metal chlorides and mixtures thereof present in a weight ratio of oxide containing material to flux in the range from 10:1 to 1:1 preferably in the range from 5:1 to 1.2:1 most preferably in the range from 2.5:1 to 1l4:1. We have found that potassium chloride or mixtures of potassium chloride with sodium chloride are the preferred flux for this aspect of our invention. The results obtained using a flux as the hydrogen chloride generator are inferior to the results obtained using a special hydrogen chloride generator such as ferrous chloride in admixture with the flux and are also inferior to the results obtained when the hydrogen chloride regenerated in our process is conserved.

The invention is illustrated by, but by no means limited to, the following examples in which all parts are parts by weight unless otherwise specified.

EXAMPLE 1

The following examples illustrates the addition of gaseous hydrogen chloride. 10g of a beach sand ilmenite analysing 56% $TiO_2$, 23.4% FeO and 17.2% $Fe_2O_3$ was heated in a stream of HCl and argon (50% HCl) in the presence of 6g of sodium chloride and 2g of petroleum coke. The temperature was maintained at 1,130°C for 2 hours.

After cooling the product was washed, the carbon removed and the remaining portion magnetically separated into two fractions without grinding.

After calcination the non-magnetic fraction analysed 94% $TiO_2$ and 1.4% iron and contained 85 percent of the titanium values. The magnetic fraction analysed 75.3 percent iron and 20 percent titanium as $TiO_2$.

EXAMPLE 2

The procedure of Example 1 was followed except that the reaction mixture was initially heated on 950°C for 1½hours, the temperature then being raised to 1,130°C for 1 hour.

The non-calcined non-magnetic fraction analysed 98.7 percent titanium as $TiO_2$ and 0.9 percent iron and contained 88 percent of the titanium values. The magnetic fraction contained 79 percent iron and 15 percent titanium as $TiO_2$.

EXAMPLE 3

This example illustrates the use of ferrous chloride as a special hydrogen chloride generator.

5g of the same ilmenite as used in Example 1 was mixed with 5.5g of ferrous chloride (as $FeCl_2.4H_2O$), 4g of petroleum coke and 6g of sodium chloride. The mixture was heated for 2 hours at 1,130°C in an initial atmosphere of argon.

The cooled washed material was magnetically separated without grinding. The non-magnetic material analysed 100.7 percent titanium as $TiO_2$ and 0.5 percent iron and contained 72 percent of the titanium values. The magnetic fraction contained 38.5 percent iron and 19.8 percent titanium as $TiO_2$. (The bulk of this product was found to be carbon).

EXAMPLES 4 – 8

The following examples illustrate the use of ferrous chloride as a special hydrogen chloride generator. 10g of the same ilmenite as used in Example 1 was mixed with 2g of petroleum coke, 6g of sodium chloride and the amount of ferrous chloride $FeCl_2 \cdot 4H_2O$ shown below. The mixture was heated for 2 hours at 1,130°C in an initial atmosphere of argon.

The cooled washed material was magnetically separated without grinding after removal or carbon. The fractions from this separation were weighed and analysed with the results shown below.

EXAMPLE 11

This example shows the application of the process to samples of ilmenite obtained from different sources. The ilmenites used were as follows:

| Sample No. | Location | Analysis % Fe | % Ti |
|---|---|---|---|
| A | Australian East Coast | 35.6 | 31.0 |
| B | Australian West Coast | 25.3 | 38.9 |
| C | do. | 31.0 | 34.0 |
| D | do. | 28.1 | 37.3 |
| E | do. | 29.8 | 35.5 |
| F | New Zealand South Island | 44.3 | 23.1 |

10g of ilmenite was mixed with 2g of petroleum coke and 6g of sodium chloride and heated in an inert atmosphere at 1,130°C for 2 hours. In the case of experiments 1 to 6 0.5g $FeCl_2 \cdot 4H_2O$ was mixed with the furnace charge to act as a hydrogen chloride generator.

In the case of experiment 7, 3.6 percent v/v hydrogen chloride was added to the gas stream.

| Example No. | Weight of ferrous chloride in g | Product Analysis | | | | | | | | | % yield of titanium | | |
|---|---|---|---|---|---|---|---|---|---|---|---|---|---|
| | | Non-magnetic | | | Intermediate | | | Magnetic | | | Non mag-netic | Inter-mediate | Mag-netic |
| | | Yield % | TiO₂ % | Fe % | Yield % | TiO₂ % | Fe % | Yield % | TiO₂ % | Fe % | | | |
| 4 | 0.4 | 20 | 98.6 | 1.7 | 30 | 87.0 | 7.3 | 48 | 24.2 | 70.2 | 34.2 | 45.5 | 20.3 |
| 5 | 0.3 | 30 | 99.5 | 0.4 | 32 | 75.0 | 12.8 | 38 | 17.9 | 70.8 | 47.5 | 41.8 | 10.8 |
| 6 | 0.2 | 53 | 99.0 | 2.0 | 7 | 55.6 | 12.6 | 39 | 13.0 | 79.0 | 85.6 | 6.2 | 8.2 |
| 7 | 0.1 | 16 | 97.9 | 0.5 | 40 | 76.1 | 13.0 | 46 | 27.5 | 66.0 | 26.6 | 51.8 | 21.5 |
| 8 | 0.05 | 29 | 90.5 | 5.4 | not separated | | | 71 | | | 42 | | 5.8 |

EXAMPLES 9 – 10

A comparison of Examples 9 and 10 shows the effect of a very high hydrogen chloride level in increasing the loss of iron from the system. 10g of the same ilmenite as used in Example 1 was mixed with 2g of petroleum coke and 6g of sodium chloride. The mixture was heated for 2 hours under a gas mixture consisting of an inert gas and the level of hydrogen chloride shown below. After removal of carbon the cooled washed product was magnetically separated without grinding. The fractions from this separation were weighed and analysed with the results shown below.

The cooled washed material was magnetically separated without grinding. The fractions from this separation were washed and analysed with the results shown below.

| Experiment No. | Ilmenite Sample No. | Product Composition | | | | | | | | % yield of titanium | | | |
|---|---|---|---|---|---|---|---|---|---|---|---|---|---|
| | | Non magnetic | | Intermediate B | | Intermediate A | | Magnetic | | Nm | Int.B | Int.A | Mag |
| | | TiO₂ % | Fe % | TiO₂ % | Fe % | TiO₂ % | Fe % | TiO₂ % | Fe % | | | | |
| 1 | A | 99.0 | 0.7 | 85.9 | 5.1 | 64.7 | 15.5 | 18.8 | 70.2 | 45.6 | 23.8 | 13.1 | 17.1 |
| 2 | B | 99.0 | 0.4 | not separated | | 65.3 | 11.6 | 21.8 | 55.0 | 51.0 | | 16.5 | 12.8 |
| 3 | C | 99.9 | 1.1 | do. | | 53.4 | 15.5 | 12.7 | 76.5 | 71.7 | | 18.7 | 9.6 |
| 4 | D | 99.2 | 1.7 | do. | | 60.0 | 19.6 | 20.0 | 67.0 | 49.4 | | 35.2 | 15.4 |
| 5 | E | 100.0 | 0.9 | do. | | 57.2 | 17.7 | 24.0 | 56.6 | 46.9 | | 34.2 | 18.9 |
| 6 | F | 92.1 | 2.5 | do. | | 53.6 | 19.8 | 13.7 | 62.3 | 18.0 | | 57.8 | 24.2 |
| 7 | G | 99.0 | 2.1 | 71.9 | 8.4 | 31.4 | 44.0 | 19.0 | 66.8 | 56.2 | 22.8 | 5.3 | 12.5 |

EXAMPLE 12

The following example illustrates the use of the process with a pelletized feed. Pellets were prepared with a core containing ilmenite coal and salt in the ratio 2:1:1, and having a coating of powdered coal. These pillets were heated to 750° in an inert atmosphere to convert the coal to coke and then for 2 hours at 1,130°C in a furnace into which a gas mixture was

| Example No. | HCl Conc in gas (vol %) | Product analysis | | | | | | % yield of titanium | | Iron loss % |
|---|---|---|---|---|---|---|---|---|---|---|
| | | Non magnetic | | Intermediate | | Magnetic | | Non Magn-etic | Int | Mag | |
| | | TiO₂ % | Fe % | TiO₂ % | Fe % | TiO₂ % | Fe % | | | | |
| 9 | 5.0 | 100.0 | 0.2 | 82.0 | 6.3 | 11.5 | 75.3 | 75.3 | 10.5 | 7.1 | 7.1 |
| 10 | 45.1 | 101.2 | 3.2 | 86.7 | 3.8 | 45.8 | 56.4 | 47.3 | 14.1 | 28.6 | 34.9 | passed having the composition nitrogen 58.7 percent carbon monoxide 37.3 percent, hydrogen chloride 4.0 percent.

After cooling the pellets were lightly crushed excess carbon removed by flotation and magnetically separated into magnetic and non magnetic fractions which assayed as follows: magnetic, 48.2 percent iron, 31.5 percent $TiO_2$, non-magnetic, 2.2 percent iron, 92.7 percent $TiO_2$. Distribution of titanium between these fractions was as follows: magnetic, 17.2 percent, non-magnetic 82.8 percent.

EXAMPLE 13

Pellets were prepared comprising 39.1 percent w/w ilmenite, 20.2 percent w/w sodium chloride and 40.9 percent w/w coking coal. The pellets were coked at 750°C to give a pellet comprising ilmenite and salt set in a matrix of cole.

A sample of the pellets was fed to a vertical kiln heated to 1,200°C.

At regular intervals pellets were withdrawn from the bottom of the kiln by a sliding grate mechanism. Fresh pellets at room temperature were added to the top of the kiln to maintain a constant level. A reducing atmosphere of carbon monoxide and hydrogen mixed with nitrogen was maintained in the kiln. The temperature of the discharged pellets was 250° C. Thus, during their passage through the kiln, pellets were heated to 1,200° C with liquefaction of flux, held at that temperature while passing through a zone of contant temperature, and cooled back to close to room temperature with solidification of flux. At the same time they were supporting a column of incoming pellets of progressively increasing weight.

The product was substantially discrete and uncrushed pellets. Microscopic examination of the product pellets showed that the pellets still comprised a matrix of coke in which were set particles of reduced ilmenite, surrounded by salt crystals.

A portion of the product pellets were lightly crushed and the resultant product was washed and magnetically separated into two fractions without further grinding. The non-magnetic fraction was found by microscopic examination to be substantially all coke. The magnetic fraction was found to be grains of anosovite, a lower oxide of titanium, throughout which were distributed specks and accretions of metallic iron.

The experiment was repeated with a second portion of pellets except that hydrogen chloride at a level of 2 percent by volume of the total kiln gas flow was introduced into the hot zone of the furnace.

The crushed product pellets were treated in a flotation cell using kerosene as collector in order to remove the residual coke. The flotation tails were then subjected to a magnetic separation step which yielded an iron-rich magnetic fraction and a titaniumrich non-magnetic fraction. Microscopic examination of the unseparated flotation tails revealed that there was substantial movement of iron from within the anosovite grains thereby enabling the magnetic separation to be made. The iron-rich fraction analysed 37 percent iron and 50 percent titanium dioxode and contained 71 percent of the iron. The titanium-rich fractions, after calcination analysed 15 percent iron and 80 percent titanium dioxide and contained 46 percent of the titanium values.

This example illustrates the effect of adding hydrogen chloride gas to a vertical kiln operation.

EXAMPLES 14 – 20

The following example illustrates the effect of varying the flux level. 10g of the same ilmenite as used in Example 1 was mixed with 2g of petroleum coke, 0.2g of $FeCl_2.4H_2O$ as a hydrogen chloride generator and the amount of sodium chloride as shown below. The mixture was heated for 2 hours at 1130° C in an initial atmosphere of argon.

The cooled washed material was magnetically separated without grinding after removal of carbon. The fractions from this spearation were weighed and analysed with the results shown below.

| Example No. | Weight of NaCl | Non magnetic | | | Intermediate | | | Product Analysis Magnetic | | | % yield of titanium | | |
|---|---|---|---|---|---|---|---|---|---|---|---|---|---|
| | | Yield % | $TiO_2$ % | Fe % | Yield % | $TiO_2$ % | Fe % | Yield % | $TiO_2$ % | Fe % | Non magnetic | Intermediate | Magnetic |
| 14 | 6.0 | 53 | 99.2 | 2.0 | 7 | 54.3 | 12.6 | 39 | 13.0 | 79.0 | 85.6 | 6.2 | 8.2 |
| 15 | 5.0 | 43 | 99.8 | 0.5 | 6 | 52.7 | 8.3 | 39 | 23.6 | 68.5 | 77.0 | 6.4 | 16.7 |
| 16 | 4.0 | 34 | 86.1 | 3.1 | 10 | 91.3 | 9.9 | 55 | 36.1 | 55.0 | 50.0 | 15.8 | 34.2 |
| 17 | 3.0 | nil | nil | nil | 25 | 89.8 | 11.4 | 75 | 54.8 | 49.2 | nil | 35.0 | 65.0 |
| 18 | 2.0 | 5 | 97.2 | 0.2 | 36 | 94.4 | 2.6 | 56 | 37.0 | 51.5 | 9.3 | 51.5 | 38.6 |
| 19 | 1.0 | nil | nil | nil | 39 | 89.5 | 12.7 | 61 | 54.0 | 46.3 | nil | 51.8 | 48.2 |
| 20 | nil | | | | no separation possible | | | | | | nil | nil | 100.0 |

Examples 16 – 20 show the effect of insufficient flux.

EXAMPLES 21 – 24

The following examples illustrate the effect of increasing the carbon to ilmenite ratio above that required for metallisation. 5g of the same ilmenite as used in Example 1 was mixed with 13 gm of sodium chloride and the amount of powdered graphite as shown below. The mixture was then heated for 2 hours at 1,130° C in an atmosphere comprising 59% $N_2$, 37% CO and 4% HCl calculated on a volume basis.

The cooled washed material was magnetically separated without grinding after removal of the graphite by floating in tetrabromoethane. The fractions from the separation were weighed and analysed with the results shown below.

| Example No. | Weight of pow- dered graphite | Product Analysis | | | | | | | | % Yield of titanium | | |
|---|---|---|---|---|---|---|---|---|---|---|---|---|
| | | Magnetic | | Intermediate A | | Intermediate B | | Non magnetic | | Mag- netic | Inter- mediate A | Inter- mediate B | Non- mag- netic |
| | | TiO₂ % | Fe % | TiO₂ % | Fe % | TiO₂ % | Fe % | TiO₂ % | Fe % | | | | |
| 21 | 5.4 | 51.8 | 43.0 | 93.6 | 8.3 | 96.6 | 3.7 | 98.5 | 2.3 | 31.0 | 35.5 | 12.1 | 13.9 |
| 22 | 3.5 | 24.5 | 57.6 | 75.8 | 17.0 | 95.8 | 3.1 | 96.2 | 2.0 | 8.4 | 24.9 | 27.1 | 24.0 |
| 23 | 2.0 | 13.0 | 69.5 | 32.6 | 28.3 | 87.4 | 7.8 | 93.9 | 6.0 | 5.8 | 9.3 | 32.6 | 50.1 |
| 24 | 1.0 | 11.0 | 74.9 | 46.0 | 20.9 | 86.7 | 6.4 | 95.0 | 3.3 | 5.9 | 6.4 | 34.4 | 47.5 |

Examples 21 and 22 illustrate the detrimental effect of high carbon to ilmenite ratios.

EXAMPLE 25

The following example illustrates the use of potassium chloride as a flux. 10g of the same ilmenite as used in Example 1 of a coal char from Collie, Western Australia, ground to pass 200 B.S.S. The mixture was then heated for 2 hours at 1,150° C in an atmosphere comprising of 60% $N_2$, 39% CO and 1% HCl on a volume basis.

The cooled washed material was magnetically separated without grinding. The magnetic fraction analysed 80.7 percent iron and 9% $TiO_2$ and contained 8.4 percent of the initial titanium, the intermediate fraction analysed 2.7 percent iron and 78.5% $TiO_2$ and contained 9.0 percent of the initial titanium and the non magnetic fraction analysed 0.7 percent iron and 98.2% $TiO_2$ and contained 82.6 percent of the initial titanium.

EXAMPLE 26

Samples of ilmenite containing 35.2 percent titanium and 29.8 percent iron which had been passed through a 150 BSS sieve were treated in the following general manner.

The ilmenite (50 parts) was mixed with 8.0 parts of wood charcoal and 30 parts of flux. The mixture was heated slowly from room temperature to between 1,100° – 1,200° C. over 3 hours and the temperature maintained for 2 hours. After cooling the reduced material was wet ground and the soluble material removed. The solid residue was divided into three fractions in the following manner. The residue was placed in a 600 ml beaker held over a strong magnet. Water was allowed to run into the beaker and the contents stirred vigorously so that a proportion of the reduced material was removed in the over flow water. This washing was repeated several times. The residue is the beaker was removed as fraction 1. The remainder of the material was returned to the beaker and the procedure repeated but with less vigorous washing. The residue in the beaker was fraction 2 and the remainder which had been removed from the beaker was fraction 3. Fraction 3 was calcined at 700° C to remove excess carbon. All three fractions were weighed and analysed.

The results achieved using the process of our invention are shown in Tables I, II, III, and IV.

TABLE I

| Flux | Fraction 1 | | | Fraction 2 | | | Fraction 3 | | |
|---|---|---|---|---|---|---|---|---|---|
| | % of total | Analysis | | % of total | Analysis | | % of total | Analysis | |
| | | % Fe | % TiO₂ | | % Fe | % TiO₂ | | % Fe | % TiO₂ |
| 100% NaCl | 30 | 78 | 21 | 35 | 11 | 80 | 35 | 9 | 83 |
| 5% Na₂CO₃ 95% NaCl | 43 | 50 | 42 | 20 | 26 | 57 | 37 | 12 | 77 |
| 100% Na₂CO₃ | 55 | 75 | 17 | 7 | 2 | 72 | 38 | 1 | 73 |
| 60% KF 40% NaCl | 28 | 84 | 14 | 4 | 28 | 62 | 68 | 10 | 74 |
| 20% CaSO₄ 80% NaCl | 34 | 67 | 25 | 21 | 17 | 64 | 45 | 7 | 62 |
| 60% CaF 40% NaCl | 55 | 71 | 28 | 10 | 8 | 66 | 34 | 3 | 50 |
| 100% CaF₂ | 74 | 46 | 46 | 13 | 10 | 23 | 13 | 3 | 42 |
| 33% CaCl₂ 67% NaCl | 22 | 79 | 5 | 4 | 35 | 43 | 75 | 13 | 75 |
| 50% CaCl₂ 50% NaCl | 15 | 74 | 9 | 8 | 42 | 37 | 76 | 15 | 68 |
| 100% CaCl₂ | 28 | 87 | 14 | 7 | 17 | 66 | 66 | 7 | 77 |
| 10% Na₂SO₄ 90% NaCl | 33 | 90 | 2 | 2 | 77 | 6 | 65 | 8 | 70 |
| 33% Na₂SO₄ 67% NaCl | 37 | 77 | 7 | 5 | 55 | 25 | 57 | 9 | 72 |
| 100% Na₂SO₄ | 13 | 83 | 7 | 2 | 30 | 21 | 86 | 10 | 59 |
| 5% Na₂CO₃ 95% KCl | 29 | 77 | 20 | 6 | 46 | 38 | 65 | 12 | 76 |

TABLE I – Continued

| Flux | | Fraction 1 | | | Fraction 2 | | | Fraction 3 | | |
|---|---|---|---|---|---|---|---|---|---|---|
| | | % of total | Analysis | | % of total | Analysis | | % of total | Analysis | |
| | | | % Fe | % $TiO_2$ | | % Fe | % $TiO_2$ | | % Fe | % $TiO_2$ |
| 10% Apatite 90% NaCl | | 18 | 55 | 25 | 9 | 25 | 60 | 73 | 19 | 63 |
| 35% Apatite 65% NaCl | | 28 | 75 | 8 | 2 | 15 | 61 | 70 | 8 | 67 |
| 50% Dolomite 50% NaCl | | 17 | 33 | 47 | 54 | 28 | 49 | 28 | 16 | 56 |
| 100% Dolomite | | 59 | 24 | 40 | 22 | 27 | 43 | 19 | 8 | 53 |

TABLE II

| Flux | | Fraction 1 | | | Fraction 2 | | | Fraction 3 | | |
|---|---|---|---|---|---|---|---|---|---|---|
| | | % of total | Analysis | | % of total | Analysis | | % of total | Analysis | |
| | | | % Fe | % $TiO_2$ | | % Fe | % $TiO_2$ | | % Fe | % $TiO_2$ |
| 3% NaF 97% NaCl | | 27 | 79 | 17 | 9 | 29 | 59 | 64 | 12 | 70 |
| 10% NaF 90% NaCl | | 45 | 62 | 33 | 17 | 11 | 77 | 39 | 9 | 79 |
| 20% NaF 80% NaCl | | 47 | 65 | 34 | 27 | 7 | 86 | 26 | 7 | 84 |
| 30% NaF 70% NaCl | | 50 | 67 | 30 | 17 | 5 | 94 | 33 | 3 | 90 |
| 50% NaF 50% NaCl | | 37 | 33 | 15 | 14 | 5 | 95 | 49 | 6 | 83 |

TABLE III

| Flux | | Fraction 1 | | | Fraction 2 | | | Fraction 3 | | |
|---|---|---|---|---|---|---|---|---|---|---|
| | | % of total | Analysis | | % of total | Analysis | | % of total | Analysis | |
| | | | % Fe | % $TiO_2$ | | % Fe | % $TiO_2$ | | % Fe | % $TiO_2$ |
| 10% KCl 90% NaCl | | 36 | 86 | 16 | 18 | 9 | 94 | 45 | 4 | 95 |
| 20% KCl 80% NaCl | | 35 | 84 | 14 | 32 | 8 | 93 | 33 | 3 | 92 |
| 33% KCl 67% NaCl | | 35 | 92 | 5 | 18 | 10 | 87 | 46 | 7 | 86 |
| 50% KCl 50% NaCl | | 28 | 86 | 14 | 9 | 13 | 81 | 63 | 8 | 82 |
| 95% KCl 5% NaCl | | 27 | 93 | 7 | 7 | 30 | 65 | 66 | 6 | 88 |

TABLE IV

| Flux | | Fraction 1 | | | Fraction 2 | | | Fraction 3 | | |
|---|---|---|---|---|---|---|---|---|---|---|
| | | % of total | Analysis | | % of total | Analysis | | % of total | Analysis | |
| | | | % Fe | % $TiO_2$ | | % Fe | % $TiO_2$ | | % Fe | % $TiO_2$ |
| 10% $Na_2B_4O_7 \cdot 10H_2O$ 90% NaCl | | 40 | 72 | 22 | 12 | 17 | 80 | 48 | 3 | 92 |
| 20% $Na_2B_4O_7 \cdot 10H_2O$ 80% NaCl | | 36 | 84 | 12 | 3 | 15 | 79 | 60 | 2 | 91 |
| 50% $Na_2B_4O_7 \cdot 10H_2O$ 50% NaCl | | 36 | 80 | 14 | 3 | 23 | 72 | 60 | 2 | 91 |
| 3% $Na_2B_4O_7 \cdot 10H_2O$ 97% KCl | | 29 | 88 | 10 | 10 | 29 | 56 | 61 | 8 | 83 |

EXAMPLE 27

The process of Example 26 was repeated except that varying amounts of flux were used. The flux consisted of a mixture of sodium chloride and borax ($Na_2B_4O_7.10H_2O$). The weight/weight ratio of ilmenite to sodium chloride and the weight/weight ratio of ilmenite to borax are shown in Table V. The analysis and yields of the three fractions obtained in each experiment are also shown in Table V.

TABLE V

| Flux Composition | | Analysis of Product | | | | | | | |
|---|---|---|---|---|---|---|---|---|---|
| w/w Ratio | | Fraction 1 | | | Fraction 2 | | | Fraction 3 | |
| Ilmenite: | w/w Ratio | | Analysis | | | Analysis | | | Analysis |
| Sodium Chloride | Ilmenite: $Na_2B_4O_7.10H_2O$ | % of total | % Fe | % $TiO_2$ | % of total | % Fe | % $TiO_2$ | % of total | % Fe | % $TiO_2$ |
| 1:0 | 1:0 | 45 | 48 | 49 | 24 | 31 | 64 | 32 | 15 | 79 |
| | 1:0.01 | 33 | 86 | 9 | 4 | 42 | 55 | 62 | 2 | 88 |
| | 1:0.02 | 34 | 91 | 9 | 3 | 39 | 76 | 63 | 2 | 90 |
| | 1:0.06 | 38 | 84 | 9 | 4 | 25 | 69 | 58 | 1 | 90 |
| | 1:0.12 | 37 | 88 | 11 | 4 | 27 | 69 | 60 | 1 | 90 |
| 1:0.1 | 1:0 | 45 | 63 | 40 | 16 | 35 | 71 | 39 | 5 | 93 |
| | 1:0.01 | 33 | 88 | 10 | 9 | 34 | 56 | 58 | 6 | 85 |
| | 1:0.02 | 33 | 94 | 5 | 3 | 41 | 53 | 64 | 4 | 87 |
| | 1:0.06 | 39 | 75 | 22 | 12 | 21 | 69 | 49 | 4 | 85 |
| | 1:0.12 | 29 | 78 | 16 | 9 | 33 | 59 | 62 | 13 | 77 |
| 1:0.2 | 1:0 | 36 | 86 | 13 | 18 | 9 | 84 | 45 | 5 | 86 |
| | 1:0.01 | 31 | 90 | 10 | 11 | 35 | 58 | 58 | 4 | 88 |
| | 1:0.02 | 30 | 90 | 6 | 7 | 35 | 56 | 62 | 6 | 87 |
| | 1:0.06 | 24 | 86 | 11 | 22 | 43 | 50 | 54 | 4 | 86 |
| | 1:0.12 | 25 | 78 | 21 | 27 | 27 | 67 | 48 | 16 | 77 |
| 1:0.4 | 1:0 | 50 | 67 | 38 | 8 | 26 | 79 | 43 | 4 | 93 |
| | 1:0.01 | 39 | 93 | 7 | 11 | 33 | 61 | 50 | 5 | 85 |
| | 1:0.02 | 32 | 88 | 10 | 7 | 31 | 60 | 61 | 5 | 85 |
| | 1:0.06 | 35 | 92 | 8 | 8 | 25 | 71 | 57 | 2 | 90 |
| | 1:0.12 | 40 | 70 | 23 | 12 | 27 | 63 | 49 | 5 | 86 |
| 1:0.6 | 1:0 | 33 | 88 | 12 | 14 | 17 | 78 | 53 | 5 | 88 |
| | 1:0.01 | 42 | 90 | 8 | 14 | 16 | 77 | 44 | 4 | 89 |
| | 1:0.02 | 28 | 91 | 9 | 8 | 25 | 68 | 64 | 7 | 86 |
| | 1:0.06 | 34 | 87 | 11 | 14 | 21 | 71 | 53 | 4 | 86 |
| | 1:0.12 | 30 | 77 | 17 | 14 | 37 | 52 | 55 | 10 | 79 |

EXAMPLE 28

Separation of the product without grinding using elutriation is illustrated by the following example.

A 10 gm sample of ilmenite from a beach sand deposit containing 33.6 percent titanium and 31.2 percent iron was mixed with 1.4 gm of petroleum cole and 6 gm of flux containing 97% KCl and 3 percent Borax ($Na_2B_4O_7.10H_2O$). The mixture was heated to 1,130°C for 2 hours.

After cooling and separation of excess carbon, the unground material was separated into two fractions by selective elutriation. The iron rich fraction (2,65 g) analysed 73 percent iron and 17% $TiO_2$ and contained 66 percent of the initial iron. The titanium rich fraction (6.4 g) analysed 17 percent iron and 76 percent $TiO_2$ and contained 91 percent of the initial titanium.

The titanium fraction was subsequently leached for 2 hours with a 10% HCl solution to yield 5.5 g of a product containing 86% $TiO_2$ and 8.7% Fe with a size distribution given in the table below.

| Screen opening (microns) | % | cumulative % |
|---|---|---|
| +150 | 45.4 | 45.4 |
| −150 +104 | 41.1 | 86.5 |
| −104 +53 | 11.2 | 97.8 |
| −53 | 2.1 | 100 |

We claim:

1. A process for producing metallic iron concentrates and titanium oxide concentrates from titaniferous ores which process comprises adding a flux to the ore to form a reaction mixture wherein the weight ratio of ore to flux is in the range from 5:1 to 1,2:1, heating the reaction mixture in an atmosphere comprising hydrogen chloride and in the presence of a reducing agent to a temperature below that at which a slag is formed so as to cause formation of metallic iron and separating the metallic iron formed thereby from the titanium oxide by physical means.

2. A process according to claim 1 wherein the weight ratio of ore to flux is in the range 2.5:1 to 1.4:1.

3. A process accoding to claim 1 wherein the hydrogen chloride in the atmosphere has a partial pressure of more then $10^{-5}$ atmospheres.

4. A process according to claim 3 wherein the partial pressure of hydrogen chloride is above $10^{-4}$ atmospheres.

5. A process according to claim 4 wherein the partial pressure of hydrogen chloride is between 0.005 to 0.04 atmospheres.

6. A process according to claim 1 wherein the process is carried out in a vertical kiln.

7. A process according to claim 6 wherein the ore is ilmenite and the ilmenite is pelleted.

8. A process according to claim 7 wherein the ore is ilmenite and the ilmenite is pelleted in admixture with the flux and part of a solid reducing agent.

9. A process according to claim 6 wherein at least part of the hydrogen chloride is recycles.

10. A process according to claim 1 wherein the reaction mixture is heated in a furnace and gases are passed through the furnace and the partial pressure of hydrogen chloride in the gases entering the furnace is more than $10^{-5}$ atmospheres.

11. A process according to claim 10 wherein the partial pressure of hydrogen chloride in the gases entering the furnace is between $10^{-4}$ and 0.6 atmospheres.

12. A process according to claim 11 wherein the partial pressure of hydrogen chloride is between 0.005 and 0.04 atmospheres.

13. A process according to claim 1 wherein the reaction mixture comprises a hydrogen chloride generator in an amount sufficient to form a theoretical partial pressure of hydrogen chloride within the reaction mixture of between $10^{-4}$ and 0.6 atmospheres.

14. A process according to claim 13 wherein the reaction mixture comprises a hydrogen chloride generator in an amount sufficient to form a theoretical partial pressure of hydrogen chloride within the reaction mixture of between 0.005 and 0.04 atmospheres.

15. A process according to claim 1 wherein the reaction mixture includes solid carbonaceous material and the weight ratio of solid carbonaceous material expressed as carbon to titaniferous ores in the reaction mixture is in the range from 0.1:1 to 0.3:1.

16. A process according to claim 15 wherein the weight ratio of solid carbonaceous material expressed as carbon to titaniferous ores in the reaction mixture is in the range from 0.12:1 to 0.25:1.

17. A process according to claim 1 wherein the reaction mixture is heated to a temperature in the range 1,050° to 1,250° C.

18. A process for producing metallic iron concentrates and titanium oxide concentrates from titaniferous ores which process comprises adding a flux chosen from the group consisting of alkali metal chloride, alkaline earth metal chloride and mixtures thereof to finely divided ore and solid carbonaceous material wherein the weight ratio of ore to flux is in the range from 5:1 to 1,2:1, heating the mixture in the presence of hydrogen chloride to a temperature below that at which a slag is formed so as to cause formation of metallic iron by reduction of the titaniferous ore and separating the metallic iron formed thereby from the titanium oxide by physical means.

19. A process according to claim 18 wherein the weight ratio of ore to flux is in the range from 2.5:1 to 1.4:1.

20. A process according to claim 18 wherein the flux comprises a compound chosen from the group consisting of potassium or sodium chloride or mixtures thereof.

21. A process according to claim 18 wherein the metallic iron and titanium oxide are comminuted to a particle size sufficiently fine for magnetic separation, and at least one magnetic fraction is separated from the mixture to obtain a titanium oxide in highly concentrated form.

22. A process according to claim 21 characterized further in that the metallic iron and titanium oxide are separated by means of magnetic separation into three fractions, namely, a first highly magnetic fraction comprising over 80 percent weight/weight metallic iron, a second intermediate fraction which is slightly magnetic and comprises between 10 and 20 percent weight/weight of metallic iron in admixture with titanium oxide and a third substantially non-magnetic fraction comprising the bulk of the titanium oxides in a purity in excess of 85 percent expressed as $TiO_2$ and a small amount, less than 10 percent of said third fraction of iron.

* * * * *